United States Patent [19]

Scharrer

[11] Patent Number: 5,519,274

[45] Date of Patent: May 21, 1996

[54] MAGNETICALLY ACTIVE FOIL BEARING

[75] Inventor: Joseph K. Scharrer, Fair Oaks, Calif.

[73] Assignee: Rotodynamics-Seal Research, Inc., Calif.

[21] Appl. No.: 301,788

[22] Filed: Sep. 7, 1994

[51] Int. Cl.⁶ .............................. H02K 7/09; F16C 32/06
[52] U.S. Cl. ............................................ 310/90.5; 384/103
[58] Field of Search ............................ 310/90.5; 384/103

[56] References Cited

U.S. PATENT DOCUMENTS

| | | | |
|---|---|---|---|
| 3,434,761 | 3/1969 | Marley | 384/103 |
| 3,520,578 | 7/1970 | Licht | 384/103 |
| 4,445,792 | 5/1984 | Trippett | 384/103 |
| 4,794,290 | 12/1988 | Nagasaka | 310/90.5 |
| 4,815,864 | 3/1989 | Jones | 384/103 |
| 4,827,169 | 5/1989 | Habermann | 310/90.5 |
| 5,051,637 | 9/1991 | Harris et al. | 310/90.5 |
| 5,083,053 | 1/1992 | New | 310/90.5 |
| 5,095,237 | 3/1992 | Bardas et al. | 310/90.5 |
| 5,126,612 | 6/1992 | Girault | 310/90.5 |
| 5,202,598 | 4/1993 | Katsumata | 310/90.5 |
| 5,231,323 | 7/1993 | New | 310/90.5 |
| 5,272,403 | 12/1993 | New | 310/90.5 |
| 5,355,040 | 10/1994 | New | 310/90.5 |

Primary Examiner—Mark O. Budd
Attorney, Agent, or Firm—Robert J. Schaap

[57] ABSTRACT

A foil bearing operable with a magnetic field providing for magnetic suspension of a shaft. In one embodiment, the bearing construction relies upon a plurality of magnetic field generating members arranged to provide a shaft forming space to envelopingly receive the shaft and effectively suspend same in a composite magnetic field. In one embodiment, each of the magnetic field generating member include coils which are energizable with an electric current. In another embodiment, the magnetic field generating members comprise permanent magnets which are used in combination to create the composite magnetic field. A foil is trained about each of the magnetic field generating elements and the foils on each of these elements effectively define the space or cavity which receives the shaft Thus, when the shaft is levitated in the space or cavity by the composite magnetic field, it can function as a rotor and can be caused to rotate through a force applied to the shaft or a housing which receives the shaft. If the magnetic fields should fail or weaken, the shaft is still supported by the foils in the same manner as with foil barings.

25 Claims, 2 Drawing Sheets

MAGNETICALLY ACTIVE FOIL BEARING

BACKGROUND OF THE INVENTION

1. Field of the Invention

This invention relates in general to certain new and useful improvements in foil bearings, and more particularly, to a magnetically active foil bearing construction utilizing a plurality of magnetic field generating members with foils trained around the members and which are arranged to form a cavity for receiving a shaft. In this way, the shaft can be effectively suspended or levitated in a magnetic field, and with the shaft functioning either as a rotor or a stator.

2. Brief Description of the Related Art

Foil bearings are widely used in supporting shafts, and particularly, rotatable shafts or rotors. These foil bearings usually comprise a plurality of foil supports which are arranged to define a cavity or space for receipt of and effective journaling of the shaft or rotor. Each of the foil supports are provided with a thin, usually somewhat flexible foil.

In many cases, the foil support is somewhat arcuately shaped and the foil is held on the support under tension. Further, in order to provide support for the foil, a fluid is often times introduced into a cavity formed between the foil and the arcuately shaped foil support. A plurality of the foil supports are arranged so that in combination, they encircle and form a space for receipt of the shaft.

Foil bearings of this type are frequently used in the journaling of light weight shafts or rotors as, for example, those found in turbines and like structures. However, the foil often times does not assume an optimum shape, particularly for a shaft or rotor which is not perfectly round. Thus, instability can result, particularly when there is relative rotation at a high speed.

Representative of the use of foil bearings is U.S. Pat. No. 4,815,864, dated Mar. 29, 1989 for Adjustable Tension Foil Bearing. This U.S. patent discloses the use of a plurality of foil supports for maintaining a continuous foil. However, it does not and could not overcome the problems of potential instability which might otherwise arise in the use of foil bearings.

Other fluid bearings which utilize foils are also known in the prior art. U.S. Pat. No. 3,434,761, dated Mar. 25, 1969 discloses a hydrodynamic shaft bearing which utilizes a plurality of foil strips arranged to surround a cylindrical shaft. U.S. Pat. No. 3,520,578, dated Jul. 14, 1970 for Journal Bearing also discloses a foil utilizing a fluid medium. In addition, U.S. Pat. No. 3,506,316 for Fluid Bearing discloses a foil arranged fluid bearing. U.S. Pat. No. 4,445,792, dated May 1, 1984 for Variable Pre-load Foil Bearing discloses yet another type of foil bearing.

Closely associated with the problem of supporting a shaft which is not completely round is the resultant instability and particularly, the unsynchronous rotation which might result. In many cases, the shaft or rotor will oftentimes shift in its position and bear against one or more of the foils surrounding the rotor. When this occurs, there is actually a loss of bearing support. Moreover, if the shaft is operating at a high speed, which often occurs with shafts utilizing foil bearings, a contact between the shaft and the bearing can result in serious damage to the bearing, if not to the structure in which the bearing is used.

Magnetic bearings, and particularly magnetic back-up bearings, are also well known in the prior art. These magnetic bearings utilize two or more opposed magnets or magnetic field generating members for generating a magnetic field to effectively support or levitate a shaft or rotor. While the magnetic bearings are effective and overcome the previously described problem inherent in foil bearings, they suffer several disadvantages inherent in the use of magnetic fields. One of the foremost problems is that if electromagnets are employed and there should be a power failure to the electromagnets, then the bearing itself immediately fails, resulting in a complete lack of journal or support for the shaft or rotatable member. If this loss of power should result during the time that the shaft or rotor is in a rotating state, considerable damage could result to the shaft or rotor, or the structure housing the shaft or rotor.

There have been proposed magnetic bearings with the use of permanent magnets. However, with permanent magnets, there is a gradual, but steady loss of magnetic flux as the magnets age. Consequently, the permanent magnetic bearings become progressively less effective with the passage of time.

In order to overcome the problem of the loss of the magnetic field or reduced field strength, there have been several proposals to use back-up bearings in combination with magnetic bearings. However, this results in a duplication of components and a substantial increase in the number of parts increasing both weight and cost to the overall structure. As a result, back-up bearing arrangements are not favored in many applications.

Exemplary of magnetic bearings and, for that matter, the back-up bearing systems associated therewith are U.S. Pat. No. 5,083,053, dated Jan. 21, 1992, U.S. Pat. No. 5,126,612, dated Jun. 30, 1992, U.S. Pat. No. 5,202,598, dated Apr. 13, 1993, U.S. Pat. No. 5,231,323, dated Jul. 27, 1993 and U.S. Pat. No. 5,272,403, dated Dec. 21, 1993.

OBJECTS OF THE INVENTION

It is, therefore, one of the primary objects of the present invention to provide a foil bearing which utilizes a magnetic field for levitating a shaft.

It is another object of the present invention to provide a combination foil bearing and magnetic bearing in which the advantages of the foil bearing and the advantages of the magnetic bearing are both obtained in a single bearing application.

It is a further object of the present invention to provide a magnetically active foil bearing of the type stated which overcomes problems of instability resulting from supporting or journaling shafts which out of round or shafts which are are not completely round or from other factors.

It is an additional object of the present invention to provide a magnetically active foil bearing in which a loss of magnetic field or decrease of magnetic power will not materially affect the operation of the bearing.

It is still another object of the present invention to provide a magnetically active foil bearing of the type stated which can be manufactured at a relatively low cost and which is highly efficient in operation.

It is another salient object of the present invention to provide a magnetically active foil bearing which is capable of finding use in a variety of applications in which foil bearings alone were disfavored and in which magnetic bearings alone were disfavored.

With the above and other objects in view, my invention resides in the novel features of form, construction, arrangement and combination of parts presently described and pointed out in the claims.

BRIEF SUMMARY OF THE DISCLOSURE

A magnetically active foil bearing which combines the advantages and some of the features of both a magnetic bearing and a foil bearing, while eliminating many of the disadvantages associated with each. The magnetically active foil bearing utilizes a magnetic field associated with a plurality of foil bearing supports to effective levitate a shaft in space.

The magnetically active foil bearing of the present invention usually comprises an outer housing. Mounted within the housing is a plurality of circumferentially spaced apart foil bearing supports. These supports are preferably, although not necessarily arcuate in shape. A foil under tension extends across a concave surface of the foil support, that is, a surface which faces the shaft. Due to the fact that each of these foil supports and the associated foils effectively surround the shaft, they will effectively journal the shaft.

The foil is preferably a somewhat resilient foil and typically formed of any of a variety of plastic sheet materials. Mylar is one of the plastic foils preferred for use in many foil bearings. However, metallic foils may also be used in accordance with the present invention. Essentially, any material which is flexible and yieldable and can function as a foil may be used.

In one embodiment of the invention, electromagnetic coils are associated with one or more, and preferably all of the foil supports which are located in the bearing housing. These electromagnets are connected to a suitable source of electrical current, and when energized, will cause a composite magnetic field in the space formed by the surrounding foil supports. The magnetic field is such that it will cause the shaft to effectively levitate within the shaft receiving space formed by the foil supports.

In another embodiment of the invention, portions of the foil supports themselves may be formed of permanent magnet materials which, in combination with the other foil supports, create the composite magnetic field. In this way, the permanent magnets will create the field for levitating or supporting the shaft.

In accordance with the above-identified construction, the shaft does not necessarily have to come into contact with any of the foils. However, if the magnetic field should fail, for any reason, the foils will effectively journal the shaft, much in the same manner as the prior art foil bearings. In like manner, the problem associated with an unsymmetrical shaft rotating at high speeds and potential destruction of one or more foils is usually alleviated, due to the fact that the shaft is generally maintained in a position within the shaft receiving space by the composite magnetic field.

The present invention also provides some features for using a substructure between the foil supports and the associated foils which extend across the concave surfaces of the foil supports. Other embodiments of the invention provide means for adjusting the tension of the foil on the foil support. Many of the adaptations used in the prior art for adjusting the tension of the foil and for providing back-up support, if needed, could also be incorporated with the present invention.

The invention possesses many other purposes and has other advantages which will be made more fully apparent from a consideration of the forms in which it may be embodied. A few preferred embodiments of the invention are illustrated in the accompanying drawings and described in more detail in the following detailed description of the invention. However, it should be understood that this detailed description and the accompanying drawings are set forth only for purposes of illustrating the general principals of the invention and that the invention is not to be taken in a limiting sense.

BRIEF DESCRIPTION OF THE DRAWINGS

Figure 1:
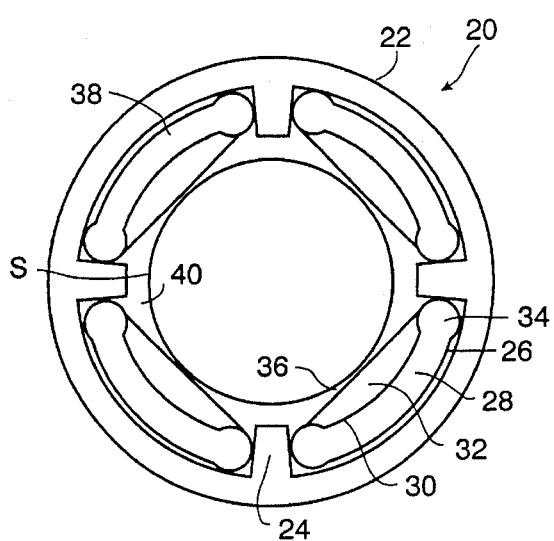
Figure 2:
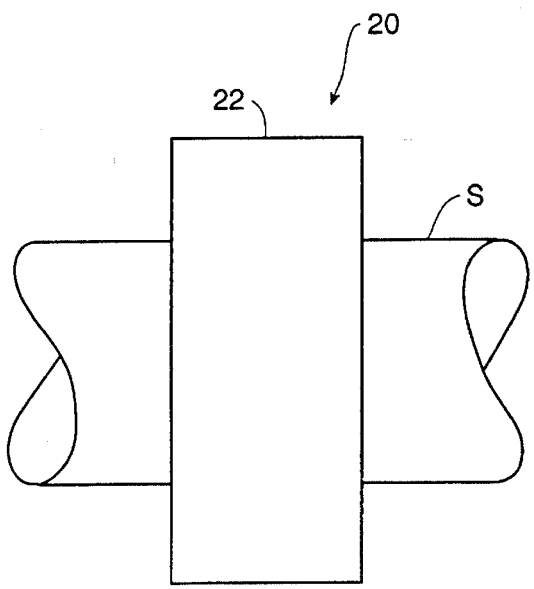
Figure 3:
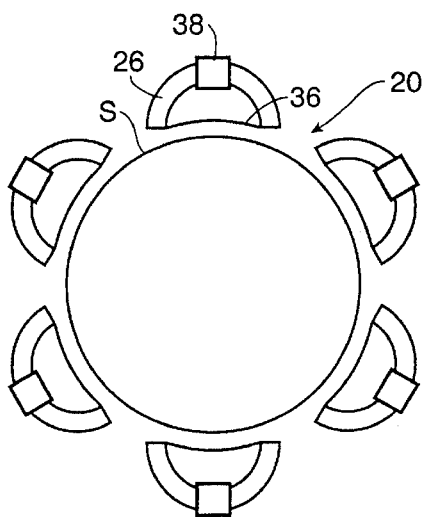
Figure 4:
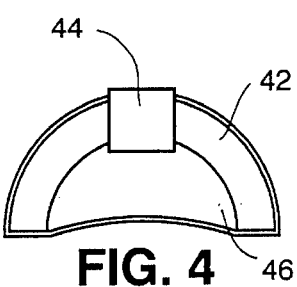
Figure 6:
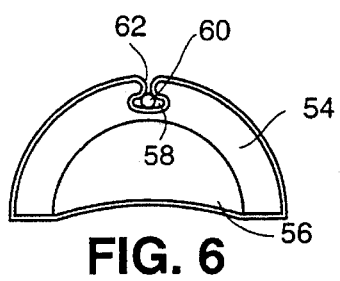
Figure 5:
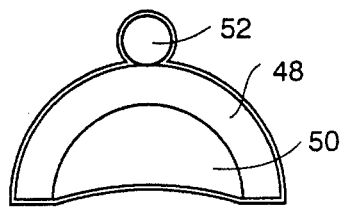
Figure 7:
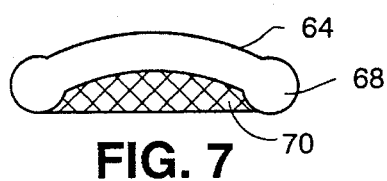
Figure 8:
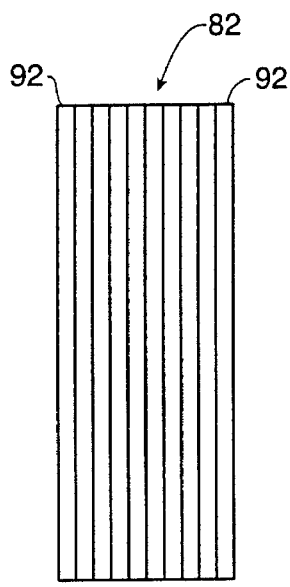
Figure 9:
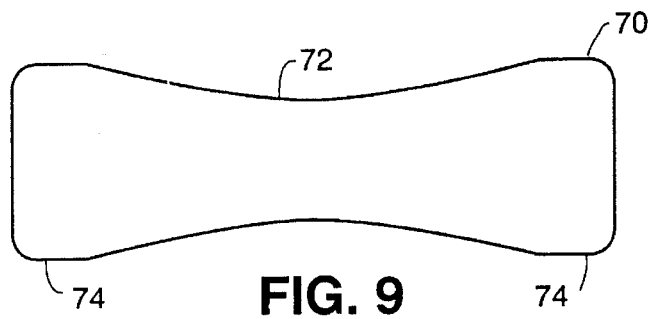
Figure 10:
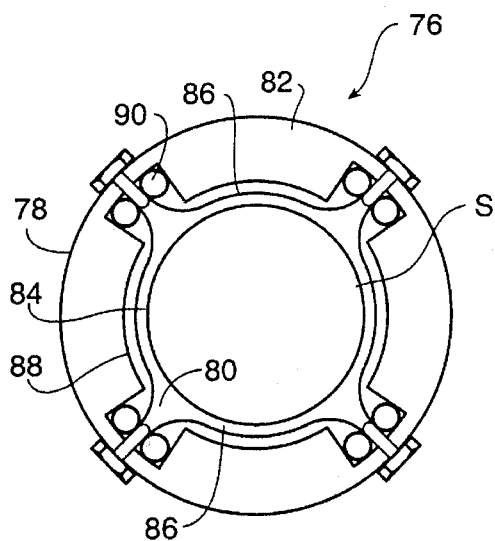
Figure 11:
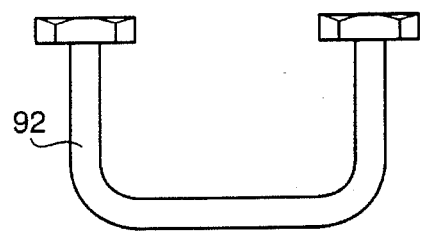
Figure 12:
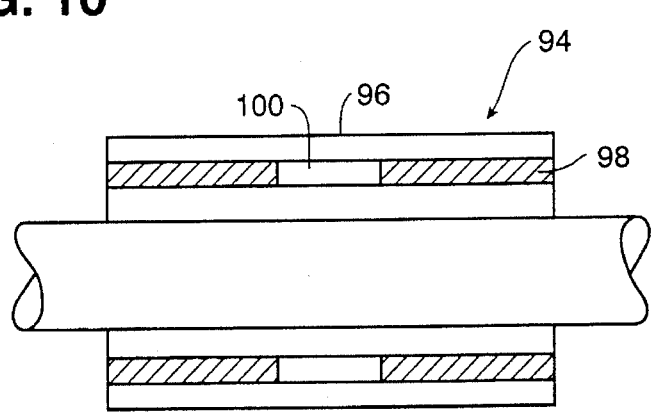

Having thus described the invention, reference will now be made to the accompanying drawings in which:

FIG. 1 is a vertical sectional view showing the interior of a housing of a magnetically active foil bearing structure which is constructed in accordance with and embodies the present invention;

FIG. 2 is a side elevational view of one form of the housing forming part of the foil bearing structure and showing the journaling of a shaft therein;

FIG. 3 is a schematic view showing a plurality of foil bearing supports with associated foil bearings and means for generating an electromagnetic field surrounding a shaft in accordance with the present invention;

FIG. 4 is a side elevational view of one form of a modified form of foil bearing support constructed in accordance with and embodying the present invention;

FIG. 5 is a side elevational view of another embodiment of a foil bearing support constructed in accordance with and embodying the present invention;

FIG. 6 is a further embodiment of a foil bearing support constructed in accordance with and embodying the present invention;

FIG. 7 is a side elevational view of still another modified form of foil bearing support constructed in accordance with and embodying the present invention;

FIG. 8 is a side elevational view showing portions of a laminated housing;

FIG. 9 is an elevational view of one form of shaft which may be journaled in the bearing structure of the present invention;

FIG. 10 is a sectional view, similar to FIG. 1, and showing a magnetically active foil bearing which utilizes permanent magnets;

FIG. 11 is a plan view of a U-bolt which may be used in the bearing of FIG. 10; and FIG. 12 is a vertical sectional view showing an arrangement of a foil bearing structure utilizing a plurality of permanent magnets.

DETAILED DESCRIPTION OF PREFERRED EMBODIMENTS

Referring now in more detail, and by reference characters to the drawings, FIG. 1 illustrates a magnetically active foil bearing which is constructed in accordance with and embodies the present invention. In connection with the following detailed description, the shaft, which is shown as being journaled in the bearing structure, will often be referred to as a rotor. However, it should be understood that the bearing housing itself could operate as a rotor with the shaft itself functioning as a stator.

In FIG. 1, the bearing structure 20 comprises an outer housing 22 which is preferably cylindrically shaped, as shown. The outer housing 22 is provided with a plurality (four, as shown) of radially inwardly extending dividers or tabs 24 forming individual foil support locations for receiving foil supports 26. Again, and in the embodiment as illustrated, only four such supports 26 are shown. However, any desired number of supports could be used in accordance with the present invention.

The foil supports 26 are shown as being arcuately shaped and have an outer convex wall 28 bearing against or in juxtaposed relationship to the interior wall of the cylindrically shaped housing 22 and an inwardly presented concave wall 30, as shown, thereby providing a cavity 32. The outer housing 22 itself is preferably a somewhat flexible member which is capable of having the end portions thereof yieldable so as to adjust the amount of tension on the foil 36. However, the foil support 26 may also be rigid, if desired. In addition, the foil support 26 is preferably metallic so as to enable the conducting of a magnetic field. However, and here again, the foil support 26 may be of a non-metallic construction.

The ends of the foil support 26 are provided with enlarged lobes 34 in the embodiment, as illustrated. These lobes 34 serve to receive the ends of a foil 36. The exact means for securing the foil 36 is not critical and any means for literally retaining the foil 36 on the outer housing 22 may be used. Further, and as indicated previously, any of the conventional foil materials used in other prior art foil bearings may also be used in the present invention.

The bearing structure 20 supports a shaft S which may be a rotor, as indicated previously, or otherwise, it may function as a stator to allow the outer housing 22 and the associated bearings to rotate. Due to the fact that the shaft S is supported in a magnetic field, and effectively levitated in this magnetic field, it is now possible to use the outer housing 22 as a rotor.

Mounted on or in association with each of the foil supports 26 are magnetic field generating members, such as coils 38. These coils 38 are connected to a suitable source of electrical current by conductors (not shown). When the coils 38 are energized, they will cause a magnetic field in the shaft receiving space 40 defined by the foil supports 26 and the associated foils 36.

FIG. 3 more fully illustrates the arrangement of the magnetic field generating coils 38 and the associated foil supports 26, along with the foils 36. It can be seen in the embodiment, as shown, that five individual foil supports are utilized. Here again, the desired number of foil supports 26 and associated foils 36 can vary, depending upon the size of the structure and the intended use.

The foil supports 26 are preferably also made of a magnetically oriented material. In this case, they may be stamped out of a pattern and capable of being tensioned, as previously described.

FIG. 4 illustrates a slightly modified form of foil support arrangement, utilizing a foil support 42, which is also arcuately shaped and somewhat similar in configuration to the foil support 26. A magnetic field generating coil 44 also surrounds and is mounted on the foil support 42. A foil 46 surrounds the entire foil support 42 in the embodiment, as shown. This foil 46 could actually be of a continuous construction, if desired. Otherwise, it would be provided with ends which are affixed to the support 42 at or in proximity to the region of the magnetic field generating coil 44.

FIG. 5 illustrates an embodiment of a foil support arrangement utilizing a foil support 48 with a foil 50 trained entirely therearound. A rotatable rod 52 is located on the exterior surface of the foil support 48 and the foil 50 is also trained around an affixed to this rod 52. The rod 52 is journaled for rotation individually and independently of this foil support 48. In this way, as the rod 52 is rotated, it will create a greater tension on the foil 50. Thus, the amount of tension which is imposed on the foil 50 can be adjusted in accordance with the present invention.

FIG. 6 also illustrates a further foil support arrangement, utilizing a foil support 54, having a foil 56 completely trained therearound. In this case, the foil support 56 is preferably of a continuous nature. The foil support 54 is provided with a recess 58 on its exterior surface and is capable of receiving a pin or rod 60 bearing against an outer surface thereof. In this way it can be seen that the foil 56 is located beneath the pin or rod 60 so that the latter can be forced into the recess 58. The recess 58 is provided with a pair of inwardly projecting ears 62 integral with opposite sides of the foil support 54 so as to barely, but nevertheless, snugly receive the pin or rod 60 so that the latter can be introduced into and retentively retained in the recess 58. Thus, by forcing the pin or rod 60 into the recess 58, tension will be imposed on the foil 56. While this type of arrangement does not necessarily provide the amount of adjustability, as provided in the arrangement of FIG. 5, it is still, nevertheless, effective for maintaining tension on the foil 56.

FIG. 7 illustrates a foil support arrangement which utilizes a foil support 64 very similar to the previously described foil support 46. Here again, a foil 66 is secured to enlarged lobes 68 at the ends of the arcuately foil support 64. In this embodiment, a substructure 70 is located in the cavity formed by the foil 66 and the arcuately shaped inwardly presented concave wall of the foil support 64. This substructure 70 could be any suitable type of substructure, such a soft flexible material, e.g., a foam or the like. Otherwise, it could be a rigid structure providing a flat surface to bear against the foil 66 in the event of any flexing of the foil 66. In cases where the substructure 70 is not used, it is possible to introduce a fluid into the cavity formed by the arcuately shaped foil support 64. This fluid could be in the form of a gas under pressure or otherwise, a liquid which is introduced into the cavity.

The magnetically active foil bearings 20 of the present invention are effective for receiving any type of shaft S, as long as it is symmetrical along its central axis. The shaft S does not have to be symmetrical longitudinally, but it does have to be symmetrical at any section along its central axis. Thus, the shaft S could have enlarged sections and diametrially reduced sections which are all circular in shape. As a simple example, FIG. 9 illustrates one form of shaft 71 which may be used in the present invention. This shaft 71 has somewhat of a dog-bone shape, that is, it has a reduced diameter central portion 72 and enlarged end portions 74. Nevertheless, since it is symmetrical about its central axis at any point along the axis, as such, it is capable of being used with the magnetically active foil bearings of the present invention.

FIGS. 8, 10 and 11 illustrate one embodiment of a magnetically active foil bearing 76 which is constructed in accordance with and embodies the present invention. This foil bearing 76 comprises an outer housing 78 formed of permanent magnetic material, as hereinafter described, and forms an interior cavity to support a rotatable shaft S. In this embodiment of FIG. 10, a plurality of individual magnets (four, as shown) are formed by recesses 84 formed in the overall cylindrically shaped housing 78. A single piece of foil 86 is disposed against the interior concavely presented surface 88 of each of the magnets 82. The foil has portions which are introduced into the recesses and retained against rods 90. The foils can be tightened at each of these pairs of rods 90 (four, as shown), by means of U-bolts 92 of the type illustrated in FIG. 11. In effect, any means for tightening the foil 86 could be used. For example, the four individual pieces of foil i.e., the foils 36, 46, 66 and 86 could be used, and the ends thereof tightened against rotatable rods located in the recesses 84.

The housing 78 is formed of a magnetic material. Moreover, the housing is formed of laminated plies 93, as shown in FIG. 11. Each of these plies 93 are preferably formed of a rare earth magnetic material. The rare earths are preferred because of their high flux density. However, super conducting ceramic materials can be used. In effect, any material which will enable sufficiently high flux density could be used in the formation of the housing 78.

The housing 78 could actually be formed of any of a number of magnetic bearing materials, such as low carbon steel, or soft magnetic iron. Further, many of the cobalt-iron alloys, such as Hiperco 50, Hiperco 27, vanadium permendur, or vanadium supermendur, may be used. In addition, some nickel-iron alloys and silicon iron alloys could be used. Some of the rare earth permanent magnets which are preferred are samarium-cobalt and neodymium-iron-boron. Other permanent magnetic materials include those known as RECo, Alnico, and Ugistab X.

FIG. 12 illustrates the magnetically active foil bearing structure 94, having an outer housing 96 which is cylindrically shaped and included within the outer housing 96 are two pairs of cylindrically shaped magnetic stacks 98 with an permanent ring magnet 100 located between the stacks 98. This permanent magnet foil bearing structure 94 also acts much in the same manner as the permanent magnet foil bearing previously described.

Thus, there has been illustrated and described a unique and novel magnetically active foil bearing which provides the advantages of foil bearings and the advantages of magnetic bearings without the most of the attendant disadvantages. Thus, the magnetically active foil bearings of the invention achieve all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A foil bearing providing for magnetic suspension and foil suspension of a shaft, said foil bearing comprising:
   a) housing means;
   b) a plurality of circumferentially spaced apart foil support members retained on said housing means;
   c) a foil located across at least part of each of said foil support members and having interiorly presented faces which are arranged to form a shaft receiving compartment; and
   d) magnetic field generating means associated with each of said foil support members creating individual magnetic fields and where the magnetic fields created at the foil support members provide for magnetic suspension of the shaft, said shaft receiving compartment being arranged and shaped to form a bearing space so that the shaft is journaled by the plurality of foils and the magnetic field in the bearing space and where the foils and magnetic fields simultaneously cooperate with one another to maintain said shaft properly positioned in the bearing space.

2. The foil bearing of claim 1 further characterized in that the magnetic field generating means comprises a coil associated with certain of said foil support members to create individual electromagnetic fields and where the electromagnetic fields are combined to provide a composite electromagnetic field for suspension of the shaft.

3. The foil bearing of claim 1 further characterized in that said magnetic field generating means are permanent magnets associated with and forming part of said housing means.

4. The foil bearing of claim 1 further characterized in that said foil supports are arranged so as to provide a shaft receiving space and where the shaft is symmetrical about its central axis at any point along its axis.

5. The foil bearing of claim 1 further characterized in that said shaft is a rotor and the housing is a stator.

6. The foil bearing of claim 1 further characterized in that the shaft is a stator and the housing means is a rotor.

7. A magnetically active foil bearing structure providing for magnetic suspension of a shaft, said foil bearing structure comprising:
   a) a plurality of circumferentially arranged magnetic field generating support elements which individually generate magnetic fields and where the magnetic field associated with each of the support elements combine to form a composite magnetic field;
   b) each of said magnetic field generating support elements having a concave surface with the concave surface facing inwardly to form somewhat of an arcuately shaped shaft receiving cavity and where the composite magnetic field generated is sufficient to support and journal a shaft;
   c) a foil extending across said concave surface of each of said magnetic field generating support elements and also providing for a bearing surface facing inwardly into said shaft receiving cavity for also supporting said shaft; and
   d) said magnetic field generating support elements also functioning as foil supports so that all of said foils in combination will journal and support said shaft in the event of a reduction or loss of said composite magnetic field such that the foils in Combination can function as a backup in the event Of such reduction or loss of magnetic field.

8. The magnetically active foil bearing structure of claim 7 further characterized in that means is provided for adjusting the tension of the foil on each magnetic field generating support element.

9. The magnetically active foil bearing structure of claim 8 further characterized in that the means for adjusting the tension comprises a rod insertable into a groove on the foil support and thereby forcing the foil into the groove.

10. The magnetically active foil bearing structure of claim 8 further characterized in that the means for adjusting the tension comprises a rotatable rod and the foil is trained about the rotatable rod.

11. The magnetically active foil bearing structure of claim 7 further characterized in that said bearing structure comprises a housing for receiving each of the foil supports and said housing is formed of a plurality of magnetically coupled laminated members.

12. The magnetically active foil bearing structure of claim 7 further characterized in that each of said magnetic field operating support elements are arcuately shaped.

13. The magnetically active foil bearing structure of claim 12 further characterized in that a substructure is located in said cavity.

14. The foil bearing of claim 1 further characterized in that each foil is formed of a magnetic material having magnetic permeability.

15. The foil bearing of claim 1 further characterized in that a separate magnetic field generating means is associated with each of said foil support member.

16. The foil bearing of claim 1 further characterized in that a separate magnetic field generating means forms part of each of said foil support members and that the magnetic fields generated by the magnetic field generating means provides a primary force for suspension of the shaft with the foils maintaining the shaft in a linear position in the bearing space in the event of a drift of the shaft.

17. The foil bearing of claim 1 further characterized in that a foil is extended around each of said soil support members and are continuous about each of said support members.

18. The foil bearing of claim 17 further characterized in that each of said foil support members have concave faces presented inwardly toward said shaft receiving space and the foils on each foil support member extends over the concave face of that foil support member.

19. The foil bearing of claim 1 further characterized in that a separate magnetic field generating means forms part of each of said foil support members and that the magnetic fields generated by the magnetic field generating means provides a primary force for suspension of the shaft with the foils maintaining the shaft in a linear position in the bearing space in the event of a drift of the shaft, the foil at each support member is extended around said foil support member and is continuous about each of said support members, and each of said foil support members have concave faces presented inwardly toward said shaft receiving space and the foils on each foil support member extends over the concave face of that foil support member.

20. A magnetically active foil bearing structure providing for magnetic suspension of a shaft, said foil bearing structure comprising:
    a) a plurality of circumferentially arranged magnetic foil support elements which individually generate magnetic fields and where the magnetic field associated with each of the foil support elements combine to form a composite magnetic field sufficient to support a shaft;
    b) a foil extending across a concave surface of each of said foil support elements and also providing for a bearing surface for said shaft; and
    c) tension adjusting means for adjustment of the tension of the foil on the foil support comprising a rod insertable into a groove on the foil support and thereby forcing the foil into the groove.

21. A magnetically active foil bearing structure providing for magnetic suspension of a shaft, said foil bearing structure comprising:
    a) a plurality of circumferentially arranged magnetic foil support elements which individually generate magnetic fields and where the magnetic field associated with each of the foil support elements combine to form a composite magnetic field sufficient to support a shaft;
    b) a foil extending across a concave surface of each of said foil support elements and also providing for a bearing surface for said shaft;
    c) each of said foil support elements being arcuately shaped and having inwardly presented concave surfaces forming a cavity at each foil support; and
    d) a substructure located in the cavity of each foil support element.

22. The magnetically active foil bearing of claim 21 further characterized in that means is provided for adjusting the tension of the foil on the foil support.

23. A combination foil bearing and magnetic bearing providing for magnetic suspension of a shaft and an auxiliary foil suspension of the shaft, said combination foil and magnetic bearing comprising:
    a) housing means;
    b) a plurality of circumferentially arranged apart foil support members retained on said housing means and form a shaft receiving compartment therebetween;
    c) recessed areas on each of said foil support members facing inwardly and defining said shaft receiving compartment;
    d) magnetic field generating means associated with each of said foil support members creating individual magnetic fields and where the magnetic fields created at the foil support members provide for magnetic suspension of the shaft, said shaft receiving compartment being arranged and shaped to form a bearing space so that the shaft is journaled by the magnetic fields;
    e) a foil located across at least the recessed area of each of said foil support members and having interiorly presented faces which are arranged to face and also form the shaft receiving compartment; and
    f) said foils being spaced apart from said shaft so that the shaft is journaled by the magnetic fields and where the shaft will be supported and journaled by the foils in the event of any failure of the magnetic fields, such that the foils and foil support members serve as a back-up to the magnetic suspension of the shaft.

24. The combination foil and magnetic bearing of claim 23 further characterized in that the magnetic field generating means comprises an electromagnetic coil associated with certain of said foil support members to create individual electromagnetic fields and where the electromagnetic fields are combined to provide a composite magnetic field for suspension of the shaft.

25. The foil bearing of claim 23 further characterized in that said magnetic field generating means are permanent magnets associated with and forming part of said housing means.

* * * * *